United States Patent
Fodor et al.

(10) Patent No.: US 7,907,559 B2
(45) Date of Patent: Mar. 15, 2011

(54) SYSTEM AND METHOD FOR MULTI-ACCESS

(75) Inventors: Gabor Fodor, Hässelby (SE); Aimo Tuoriniemi, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 737 days.

(21) Appl. No.: 10/583,947

(22) PCT Filed: Dec. 22, 2003

(86) PCT No.: PCT/SE03/02077
§ 371 (c)(1), (2), (4) Date: Jan. 16, 2007

(87) PCT Pub. No.: WO2005/062652
PCT Pub. Date: Jul. 7, 2005

(65) Prior Publication Data
US 2007/0217349 A1    Sep. 20, 2007

(51) Int. Cl.
H04W 4/00 (2009.01)
H04B 7/204 (2006.01)
H04B 7/212 (2006.01)
H04B 7/208 (2006.01)
H04L 12/56 (2006.01)
H04L 12/43 (2006.01)
H04M 1/00 (2006.01)

(52) U.S. Cl. ......... 370/328; 370/331; 370/319; 370/337; 370/344; 370/407; 370/347; 370/461; 455/435.2; 455/552.1

(58) Field of Classification Search ............... 370/395.5, 370/328, 331, 310.2, 329, 319, 337, 344, 370/347, 407, 461; 455/552.1, 435.2
See application file for complete search history.

(56) References Cited

U.S. PATENT DOCUMENTS

2003/0142641 A1* 7/2003 Sumner et al. ............ 370/328
2003/0198204 A1* 10/2003 Taneja et al. ............ 370/332
(Continued)

FOREIGN PATENT DOCUMENTS
EP    0 980 190    2/2000
(Continued)

OTHER PUBLICATIONS

International Search Report for PCT/SE2003/002077 dated Jul. 13, 2004.
(Continued)

*Primary Examiner* — Marivelisse Santiago-Cordero
*Assistant Examiner* — Mong-Thuy Tran
(74) *Attorney, Agent, or Firm* — Nixon & Vanderhye P.C.

(57) ABSTRACT

A system and a method allowing a user terminal (18) in a network to simultaneously access a plurality of radio based access networks (19, 20) of diverse access technologies. Characteristic features of the invention are access selection adapters (22, 23), each one associated with a respective radio based access network, and an access technology independent access selector (26). An access adapter has means (32) for receiving access technology dependant information from its respective access network and means (31) for translating the information into access technology independent status information. The access selector comprises an access selection algorithm (33) interacting with applications (27) resident in the user terminal and with each access adapter for selection of a radio access network based on an individual QoS profile associated with each respective application and on said access technology independent status information. The invention also relates to a method for service scheduling.

16 Claims, 6 Drawing Sheets

U.S. PATENT DOCUMENTS

| | | | |
|---|---|---|---|
| 2004/0028009 A1* | 2/2004 | Dorenbosch et al. | 370/329 |
| 2004/0085957 A1* | 5/2004 | Verma | 370/389 |
| 2004/0151162 A1* | 8/2004 | Ramaswamy | 370/352 |
| 2004/0260750 A1* | 12/2004 | Ruutu et al. | 709/200 |
| 2004/0264474 A1* | 12/2004 | Sbida | 370/395.5 |

FOREIGN PATENT DOCUMENTS

| | | |
|---|---|---|
| EP | 1 091 528 | 4/2001 |
| WO | 96/28947 | 9/1996 |
| WO | 00/45614 | 8/2000 |
| WO | 01/35585 | 5/2001 |
| WO | 02/30133 | 4/2002 |

OTHER PUBLICATIONS

Gabor Fodor et al., "Providing Quality of Service in Always Best Connected Networks", IEEE Communications Magazine, Jul. 2003, pp. 154-193.

P.M.L. Chan et al., "Mobility Management Incorporating Fuzzy Logic for a Heterogeneous IP Environment", IEEE Communications Magazine, vol. 39, No. 12, Dec. 2001, pp. 42-51.

M. Brunner, "Requirements for Signaling Protocols", The Internet Society, Aug. 2003, (34 pages).

J. Wroclawski, "Specification of the Controlled-Load Network Element Service", Sep. 1997, (19 pages).

* cited by examiner

Output Access System = fa(MAX(AC1, AC2, AC3)),

Where:

fa(ACi) = gives the index of the access system to which
the ACi parameter belongs; e.g. fa(AC3) = 3.

AC1 = Ln(W1 * (IU9-I11)/N1+1) + Ln(W2*(IU10-I12)/N2+1) + Ln(W3*(IU11-I13)/N3+1);
AC2 = Ln(W1 * (IU9-I21)/N1+1) + Ln(W2*(IU10-I22)/N2+1) + Ln(W3*(IU11-I23)/N3+1);
AC3 = Ln(W1 * (IU9-I31)/N1+1) + Ln(W2*(IU10-I32)/N2+1) + Ln(W3*(IU11-I33)/N3+1);

Where:

W1 = weight factor for bit error rate; N1 = normalization constant for bit error rate
W2 = weight factor for expected delay bound; N2 = normalization constant for expected delay bound
W3 = weight factor for packet loss ratio; N3 = normalization constant for packet loss ratio

SYSTEM AND METHOD FOR MULTI-ACCESS

This application is the US national phase of international application PCT/SE2003/002077 filed 22 Dec. 2003, which designated the U.S., the entire content of which is hereby incorporated by reference.

TECHNICAL FIELD OF THE INVENTION

The invention relates to a system and a method allowing a moving user terminal to simultaneously access a plurality of access networks which may have different network technologies. An access selector selects networks according to the ABC (always best connected) concept.

BACKGROUND OF THE INVENTION

Future mobile systems are expected to support multiple radio access technologies, as well as diverse types of user equipments, including mobile phones, personal digital assistants (PDA), laptops, as well as wireless personal area networks, moving networks and vehicular networks.

Refer to FIG. 1 which illustrates a future scenario which illustrates a vehicular network 1, for example Ethernet onboard a bus, a non shown passenger has a personal local network (PAN) 2 to which a mobile phone and digital camera are connected. Another non shown passenger has also a PAN 3 to which an audio equipment and a video camera are connected. The PANs are wireless connected to an on-board wireless gateway WG that provides connectivity to an access router AR of a 4G wireless network or an access router of a wireless local area network (WLAN) 5, which in its turn provides connectivity to an access router of a land based IP backbone network 6. A 3G network 7 is also connected to the backbone network. A wireless lap top is connected to the 3G network. Vehicle movements entail hand-over for the vehicle WG, but may remain entirely hidden to passengers.

The term always best connected (ABC) in multi-access networks refers to the concept of defining a set of access selection criteria and mechanisms that allow users to get connected to various services in a nearly optimal manner irrespective of the terminal type [1]. For instance, in the vehicular network the on-board WG provides cellular connectivity through 2.5/3G cellular technologies to the 4G wireless network 4 on the country-side while it provides connectivity to the wireless local area network 5 at a central bus station. It is important to note that in such a situation, passengers may want to select access in order to being 'best' connected, even though they may use, for instance, an Ethernet interface from their respective user equipments to get connected to the WG.

Therefore, these types of vehicular or moving network scenarios can be thought of as 'multi-hop' scenarios in terms of the number of layer-2 (L2) connections between the end-user equipment and the access router (AR) of the IP-based backbone network. In such an environment it is a non-trivial issue how information about QoS can be provided to a QoS aware access selection algorithm which runs in an access selector of the user terminal.

Access selection has been the topic of intensive research recently; see for instance [2], where a multi-access architecture and associated decision algorithm based on QoS parameters (Quality of Service) are proposed. FIG. 2 shows the architecture proposed in [2]. A multimode terminal (MMT) 8 is capable of operating in three access networks; a satellite access network 9, a UMTS access network, and a GPRS access network. The MMT comprises terminal equipment (TE) 12, such as a laptop or any handheld terminal, a terminal interworking unit (T-IWU) 13, and three access specific mobile terminals 14-16. The T-IWU keeps track of the availability of access networks, is involved in all inter-access mobility procedures and cooperates with the access specific mechanisms for providing quality of service (QoS) over the multi-access network. Using certain parameters, including the condition of the radio coverage, and QoS perceived by the user, the MMT continuously executes procedures with the objective of selecting the most suitable access network. Any modification to said parameters leads to a change of access network. In order to ensure minimal modifications to the access systems most of the intelligence of the system is placed in the terminal.

SUMMARY OF THE INVENTION

The known MMT comprises different access technologies. By definition the MMT will thus be technology dependent. This implies that if a novel access system is introduced on the market, then modifications must be made within the MMT.

The access selection algorithm used in the MMT operates directly on layer 2 (L2) parameters which makes the algorithm itself technology dependent. This means that if a novel access system is introduced on the market, then the algorithm must be redesigned.

An application need to be aware of the access technology used in the access network if the access selection algorithm described in [2] is used. Application programmers often forget to program the necessary access information into the application. The user must then configure the application, a task which many users are not familiar with.

An aspect of the present invention offers a solution on the following problem: Passengers traveling in a vehicle need to be able to select the radio access network that provides connectivity from the vehicle's wireless gateway or, if the passenger's user terminal is equipped with a wireless interface, directly from the user terminal to the access router of a radio access network. Passengers are assumed to have user terminals that do not have information about the available accesses from the vehicle's wireless gateway.

An object of the present invention is to provide a system and method for access selection which is independent of the technology used in the access networks. An access technology independent access selector is completely unaware of the technology and QoS parameters used in layer 2 and beneath, which is one of several advantages of the invention. Another advantage is that no modifications of the access selector or of the access algorithm need to be done if new access technology is introduced in access networks. An application which uses a technology independent access selector requires no access specific information included in its software.

Yet another advantage is that an application need not be aware of the access technologies, neither of the access selection adapters; it is sufficient an application has an interface with the spanning layer. In other words, access technologies and access selection adapters are transparent to the applications.

DETAILED DESCRIPTION OF EMBODIMENTS

Figures 1, 2:
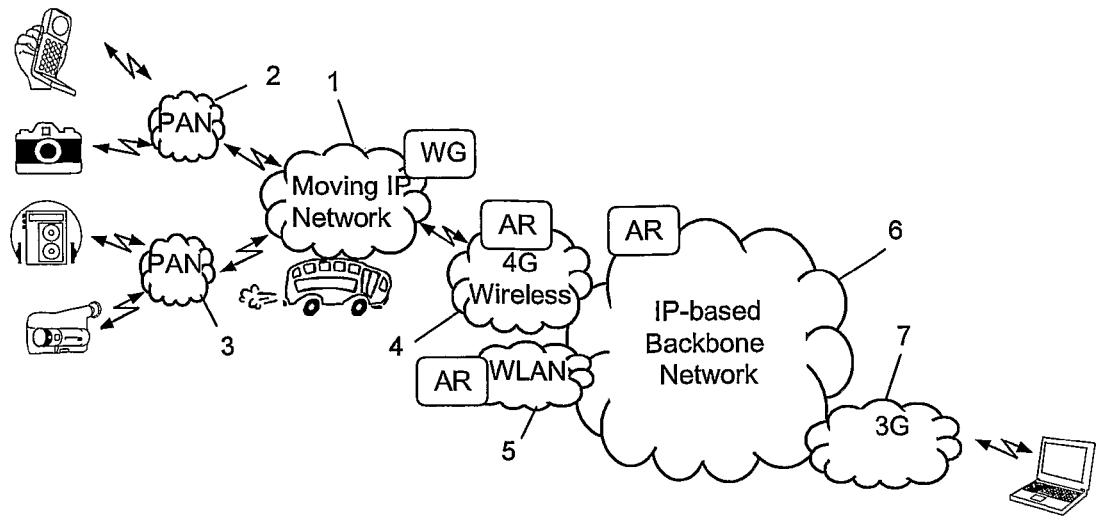
FIG. 1. is a network view illustrating a moving IP based network which connects to different radio access networks along its route, FIG. 2. is a block diagram of a known multimode terminal FIG. 3. is a block diagram illustrating a first embodiment of a system in accordance with the invention, FIG. 4. is a block diagram illustrating a second embodiment of a system in accordance with the invention, FIG. 5. is a schematic view illustrating how the system generates wireless hints, FIG. 6. is a functional view of an implementation of an access selector in accordance with an embodiment of the invention and a general access technology dependent access selection adapter, FIG. 7. illustrates an access selector and its input parameters, FIG. 8. discloses an access selection algorithm, FIG. 9. is a graph illustrating the behaviors of the log functions used in the access selection algorithm, FIG. 10. illustrates a UMTS mobile network, and FIG. 11. is a layered view of the bearer services of the UMTS mobile network of FIG. 10.
Figure 3:
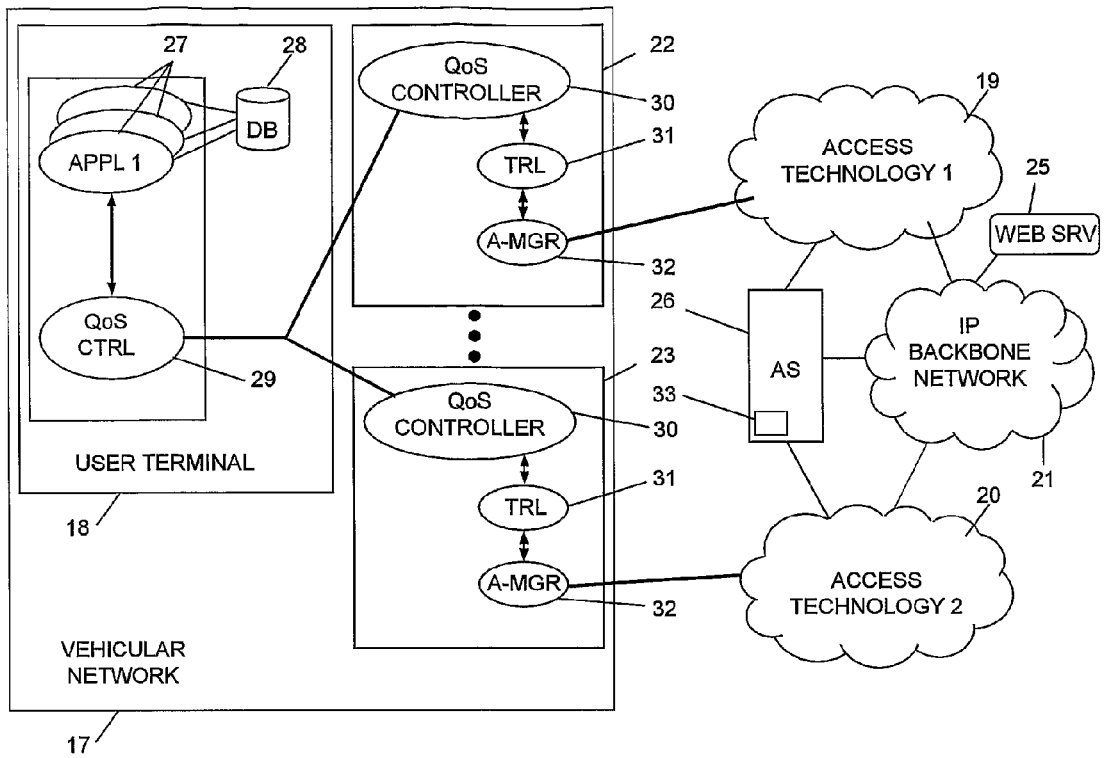

The system of a first embodiment of the invention shown in FIG. 3 comprises a vehicular network 17 to which a plurality of user terminals (UTs) may connect. In FIG. 3 only one user terminal is shown at 18 for clarity reasons. The vehicular network can connect to a number of radio access networks 19, 20 each of which has an individual access technology. The access networks are connected to a backbone network 21. There may be more access networks than the two shown. In order to connect to an access network the vehicular network comprises wireless gateways 22, 23, one for each type of access network technology. Wireless gateway 22 is thus adapted for access to an access router AR of access network 19, which uses access technology 1, over an air interface. Wireless gateway 23 is adapted for access to another access router AR of access network 20, which uses access technology 2, over another air interface. In the following the wireless gateways will be referred to as access selection adapters since they comprise novel hardware and software entities that provide access technology independent information used by an access selector 26 for access selection.

The access selection adapters 22, 23 may simultaneously have access to their respective access networks. The vehicular network will in this respect behave like a multi-mode terminal.

As the vehicular network moves it will shift its accesses from one set of networks to another set of networks. As seen from the backbone network a moving vehicular network behaves like a mobile terminal shifting its connection from one access router to another; in successive handover processes.

On-board user terminals make use of several on-board access technologies, such as a local Ethernet, Bluetooth or WLAN to access the respective access selection adapters.

In the embodiment shown in FIG. 3 the access selector 26 is a network element connected to each of the access networks and to the backbone network.

Figure 4:
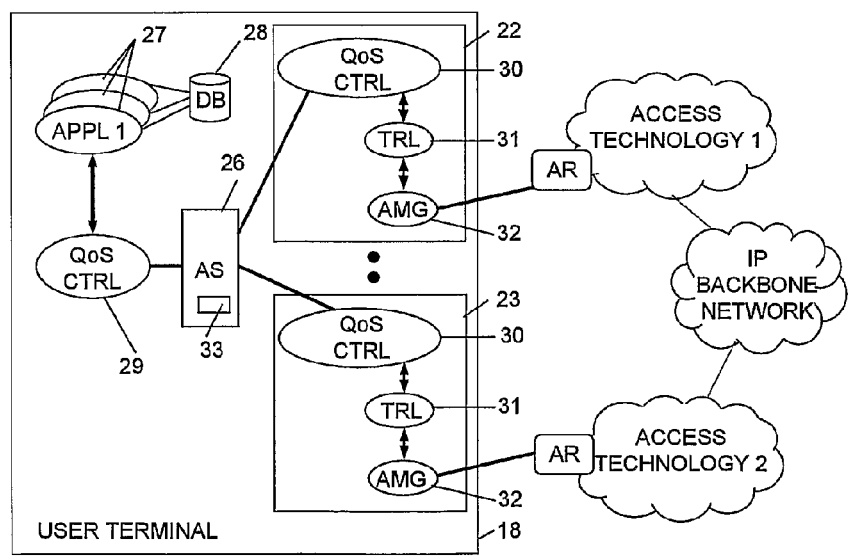

In the embodiment shown in FIG. 4 the access selector 26 is not a network element but is housed in the user terminal 18. The user terminal 18 also comprises the access selection adapters 22, 23 and its translators and access managers. The access selector 26 is connected to each one of the access selection adapters 22, 23. The entities shown in FIG. 4 are the same as those shown in FIG. 3 and have therefore been indicated with the same reference designations. Note that the user terminal 18 has direct wireless connection to the access networks and that it is not connected to a moving vehicular network. The user terminal is moving. An application may use one access network simultaneously as another application is using another access network and the terminal is called a multi-access mobile terminal.

Having described two general systems, the details thereof will now be described.

Applications

The user terminal comprises a number of applications 27. When an application 27 is installed on the terminal the user is typically asked for configuration preferences, such as default preference for which access to use when the user is at home, what kind of subscription the user has, in which cases the user as an example may reply with ADSL as preferred access and gold (or silver) as subscription type. All preferences given by the user are stored in a configuration database 28. When later the application executes, the run time part of the application need not concern itself with the configuration information, since this information will automatically be delivered from the data base 28 to the entities which require this information. When an application has not yet received user preferences, it is possible for the application to use the preferences stored by a similar application in the database. The user may for example have given his preference to use a minimum bit rate of 150 kbit/s for one video application. Another video application, in which the user's preferred bit rate has not yet been received, may then use this value of 150 kbit/s.

It should be noted that an application is not normally concerned about the access technology used, be it UMTS (Universal Mobile Telecommunications System), UTRAN (UMTS Terrestrial Radio Access Network) or any other 3.sup.rd or future 4.sup.th generation mobile system. Delay, however, is of concern for an application, and this and similar parameters will be touched upon in connection with the description of so called wireless hints.

QoS Controllers

A quality of service (QoS) controller 29 in the user terminal has an important task to generate the requirements an application has on transport quality all the way from source to destination. A video application may for example require a minimum bandwidth and a maximum delay for transmission of a movie from a remote contents database in the backbone network to the user terminal. These QoS related requirements are access technology independent information called wireless hints and comprise a set of QoS related parameters (all of which are independent of the used access technology). The wireless hints of an individual application will in the following be called the QoS profile of the application. The QoS profile generated by QoS controller 29 is communicated to the access selector 26 and is used therein as a first set of inputs upon which it bases its selection of access network.

A similar QoS controller 30 is resident in each of the access selection adapters. It is recalled that an individual access selection adapter is associated with a specific access network and the main task of the QoS controller 30 is to receive as input access technology dependent QoS related information (parameters) and map them to access technology independent status information. The status information generated by a QoS controller 30 is communicated to the access selector 26 and is used therein as a second set of inputs upon which it bases its selection of access network.

Translators

A translator 31 is program software is access technology dependent. It understands messages and access specific parameters therein as received from an associated access manager 32. It translates messages and parameters received from its associated access network into QoS parameters which it transmits to its associated QoS controller 30 wherein they are mapped to the access technology independent status information for transmission to the access selector 26.

As an example, if the access network is PSTN, then the translator must understand the SS7 (Signal System No. 7) protocol, such as the four call phases on hook, call set up, transmission phase and tear down, and the signals associated with these phases such as number taking, ring signal, ring tone etc. and must provide QoS parameters on the access technology.

Access Managers

The access manager 32 handles connection set up, connection tear down, error coding and every process as required by its associated access network. It also provides a QoS description to its associated translator. It may also contain a resource manager. The access manager sets up the access bearer service towards its respective access network. In order to be able to set up the bearer service the access manager needs the wireless hints mentioned under QoS controller 29. The access manager receives so called layer 2 trigger signals (L2 triggers for short) from its associated access network. An L2 trigger indicates that there has been a change in the access network, for example that the signal strength between the access network and the corresponding access selection adapter has changed, for example decreased below a minimum level. An L2 trigger may also indicate when the access network becomes available for a moving terminal or moving network; it then signals "Hello, I'm available now and can provide my connection services". An L2 trigger is signaled to the access selector and may cause it to order a change of access network.

A network bearer service describes how a given network provides QoS. It is defined by a signaling protocol, a user plane transport and QoS management functions.

Access Network

Examples of access networks are UMTS, UTRAN, wireless LAN, CDMA-2000, PSTN.

Backone Network

Examples are Internet and an operator's network.

Access Selector

The access selector 26 selects access network based on an application's QoS profile and the network's status information. The access selector 26 contains an access selection algorithm 33 which based on the first and second sets of inputs decides access network to be used for an individual application. The access selector 26 is independent of the technology used in the access networks. It is embodied in the form of program software and a de-multiplexer. An access network may broadcast its status information. An access selection adapter 22, 23 may also probe its associated network to obtain status information.

Communication

The access selection adapters 22, 23 comprise a protocol spanning the access networks and the backbone network and the access selector 26, thus allowing interoperation between an application and an end terminal connected to the backbone network and making the access adapters transparent to the applications. Preferably an "all IP" technology is used. The protocols used for transmission of QoS profiles, status information, L2 triggers, and decision of access network, are the IPv4 and IPv6 protocol suits.

It should be noted that a user terminal 18 may have direct wireless access to an access router of an access network, overriding the vehicular network.

It should be noted that a user terminal may have direct wireless access to an access router of an access network, overriding the vehicular network.

In FIGS. 3 and 4 the protocol used for communication between the QoS controller 29 in the user terminal and the access specific QoS controllers 30 is the IP signaling protocol proposed by the NSIS working group of the IETF, this protocol being called NSIS-protocol for short which is described in reference [3].

Access Selection Procedure

Step 1

During Step 1 the access selector 26 collects input to its access selection algorithm 33 in response to the start of an application in the user terminal. The user terminal uses IP level QoS signaling to communicate the QoS profile and other preferences of the started application to the access selector 26. It is assumed here that the user terminal knows the IP address of the access selector 26.

In addition, the access networks that are available to the vehicular network 1 provide status information and make such information available to the access selector 26 using IP level QoS signaling.

In the embodiment shown in FIG. 3 the access selector 26 is directly connected to the access networks and therefore such status information can be directly communicated to the access selector 26 for example by using an access network specific interface towards the access selector 26.

In the embodiment shown in FIG. 4 where the access selector 26 is housed in the user terminal 18 the access selector 26 uses an IP level interface only and is for example connected to the backbone network as a selector server entity. Also access networks use IP level signaling to transport status information to the access selector 26. In this latter case it is assumed the access network is capable of performing (1) translating access specific information to IP level information elements and (2) using IP level signaling towards the access selector 26.

The QoS profile as well as the status information can be updated periodically or on an 'event basis'. For instance, when the access technology provides L2 triggers, a L2 trigger signal can entail an IP level signal to the access selector 26, said L2 trigger containing information about the changes in the access network status, for example that the network connection has been degraded or improved.

Step 2

During Step 2 the access selector 26 executes the access selection algorithm 33 that attempts to find the 'best' access in terms of the QoS parameters given in the QoS profile associated with the application and possibly also given by other metrics. The output of this process is the identification of the access network that should be used by the application.

Step 3

During Step 3 the access selector 26 communicates the access decision to the user terminal. For this purpose, the access selector 26 uses IP level QoS signaling. Once the user terminal obtains this information, it instructs the associated access selection adapter 22, 23 to set up and configure the access technology specific radio bearer. At this stage, the application 27 is ready to use the selected access for user data transport.

Once an access network has been selected a radio bearer service need to be configured therein according to the QoS profile and other requirements set by the user as will be explained further down. This configuration is done by the access manager associated with the selected access network. As an example, suppose the selected access network is UMTS, the proper UMTS attach procedure and the packet data protocol (PDP) context signaling have to be performed.

In the FIG. 3 embodiment of the system the QoS profile and access decision is for example communicated to the access selector 26 over an 'old' access, that is an access previously used by the application, or is broadcasted in the selected access network.

Wireless Hints

Figure 5:
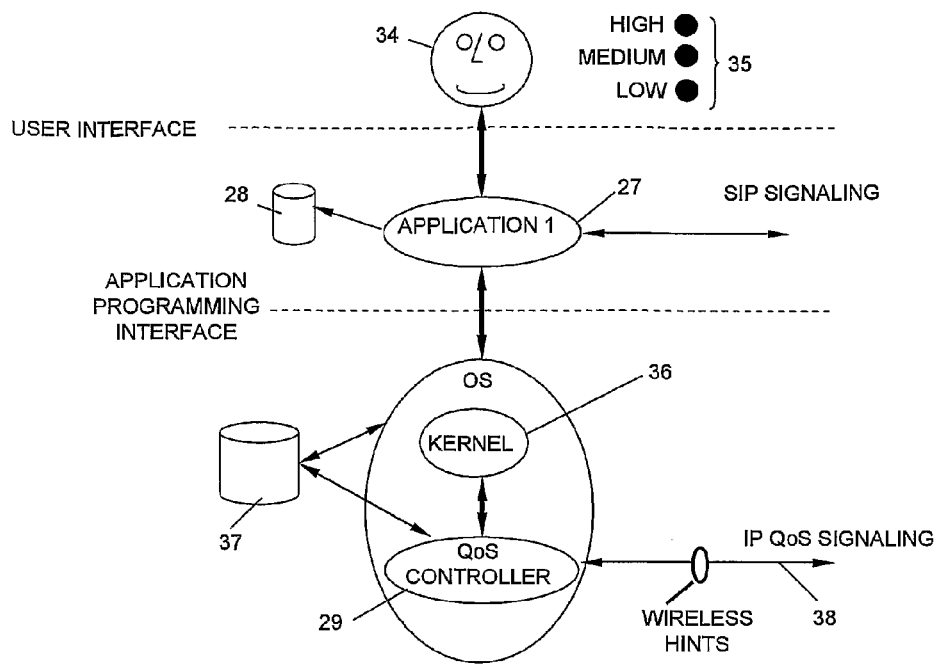

FIG. 5 illustrates how wireless hints are generated by the QoS controller 29. A user 34 is in control of the QoS (of an application) at the human level. The QoS can be high, medium or low as selected by the user by clicking or pressing a corresponding button 35 appearing on the terminal display.

Below the human level is an application level at which the application 27 executes. The application is configured from the database 28. The application signals to other entities, for example to a web server 25 connected to the backbone network as shown in FIG. 3, and uses the SIP protocol for this (Session Initiating Protocol). Information elements appearing in the SIP protocol may be used as wireless hints.

Below the application level is the terminal's operative system which described in very general and incomplete terms comprises a kernel 36, the QoS controller 29 and a database 37 that contains QoS preferences set by the user or a system operator. Examples of such preferences are "Pictures should be displayed with high resolution" and "preferred transmission rate is 64 kbit/s".

The preferences selected by the user, the preferences stored in the data base 37 and those in data base 28 as well as selected SIP information elements are all communicated to the QoS controller 29 which assembles them and generate the wireless hints which are signaled to the access selector 26 using an IP QoS protocol, such as NSIS. This wireless hint signaling is illustrated by arrow 38.

A wireless hint shall hint the access selector 26 of the QoS to be used for transmission of user data over the air. The QoS parameters used as wireless hints need to be straightforward for the applications (and the application programmers) to set, a basic requirement is that these parameters should be as simple as possible in terms of interpretation and how their values should be determined. This requirement suggests that these types of "wireless hints" should be qualitative rather than quantitative. For instance, we propose an "expected delay bound" parameter that provides a hint whether the application is delay sensitive or not, rather than requiring an exact value to be set. Since the parameter is qualitative, it can even be set by other entities (e.g. by a SIP signaling entity as described above) rather than requiring the application programmer or the human user to set/configure them. On the other hand, the parameters should help resource scarce (typically wireless and cellular) link resource managers to configure the wireless resources and QoS.

Suitable wireless hints are based on the Controlled Load (CL) integrated service parameters, as defined by RFC 2211. The CL service is intended to support a broad class of applications including adaptive real-time applications and it thus provides a reasonable base for defining the information elements. However, the wireless network characteristics and requirements must differ from typical wire-line interfaces and additional information is needed. Thus, it is proposed to extend the CL service with optional parameter information that will be useful for wireless networks to enable appropriate settings for the radio bearer characteristics. It is noted that although this optional information is proposed for the CL service, it may also be applied to other services e.g. Guaranteed Quality of Service.

Examples of wireless hints are: control load parameters, media description parameters using the Multipurpose Internet Mail Extensions (MIME) as standardized by the IETF, packet format information, expected delay bound, packet loss ratio, bit error rate (BER), packet handling priority, packet loss ratio (PLR).

QoS parameters in a QoS profile may change quickly over time and therefore a QoS profile is of a dynamic character.

Further to wireless hints a QoS profile may include signal strength, signal quality, delay, service precedence, reliability, mean throughput and peak throughput, cost and available bandwidth and combinations thereof.

Figure 6:
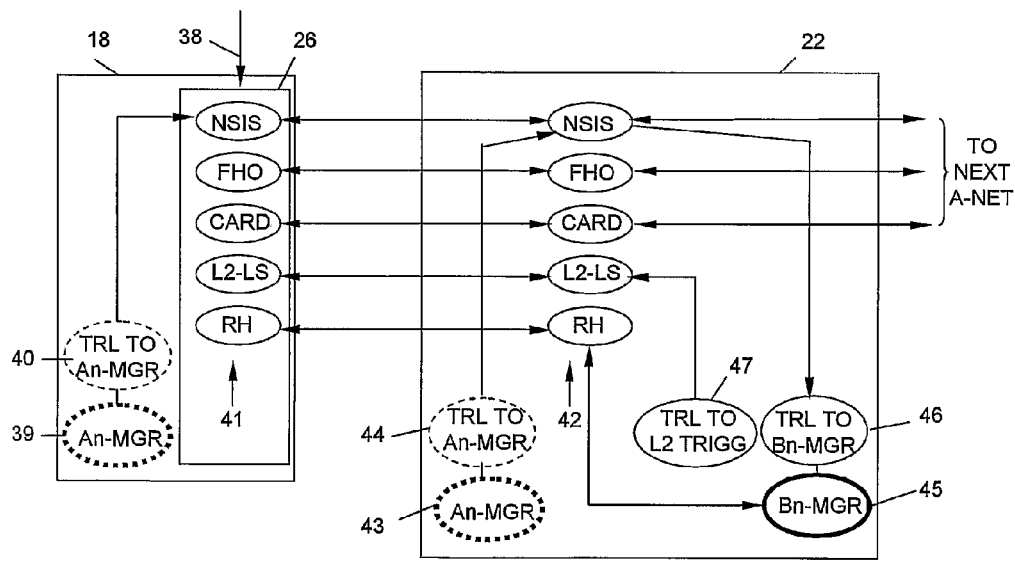

FIG. 6 illustrates an implementation of a user terminal 18 and a generalized access selector adapter 22. The figure does not show the complete terminal structure but is focused on the interface between the user terminal and the access selection adapter 22.

IP packets are exchanged between the access selector 26 and the access adapter 22 and these packets contain access information, reservation/release router configuration and access system resources. This information is either reported by the access network, which for example can broadcast it, or information requested by the access selector 26.

Wireless hints are reported to the access selector 26 from the QoS controller 29 as shown by arrow 38.

The user terminal 18 comprises an access manager 39, an associated layer 2-to-layer 3 translator 40 and the access selector 26. The access selector 26 comprises a set of link independent QoS related software processes for access procedures collectively shown at 41.

The access adapter 22 comprises a similar set of link independent QoS related software processes collectively shown at 42, an access manager 43, an associated layer 2-to-layer 3 translator 44, an access manager 45, an associated layer 2-to-layer 3 translator 46 and a translator 47 that translates layer 2 triggers, which are access dependent, into access independent information.

Entities shown at ellipses with a thick border line operate on layer 2, while entities shown at ellipses with a thin border line operate at layer 3.

The abbreviation An defines a wireless access network onboard a vehicle, that is a first "hop" extending between the user terminal 18 and the access selection adapter 22. The "n" in An indicates that it can there may be several such wireless access networks, such as Bluetooth, WLAN, onboard the vehicle. If there are no such onboard wireless networks, and the terminal connects to the access selection adapter 22 via a local wire based network, then no access managers 39 and 40 and corresponding translators are needed. Therefore these entities are shown with dashed lines.

The abbreviation Bn is a general definition of access between the access adapter 22 and a land or space based access network, for example access network 21 in FIG. 3. The "n" in Bn indicates that there may be several such access networks. There is one access adaptor 22 for each access network, and accordingly only one B-access manager per access network, although the Bn access manager 45 in FIG. 6 intimates there may be several access managers in one and the same access adapter 22 because of the "n". Each one of the Bn access managers 45 handle a respective access that use different access technologies, each such technology requiring a respective bearer access manager. The Bn access managers need to be installed and configured in accordance with the existent access networks.

An access manager, also called a bearer service manager, is an layer 2 (L2) entity, which establishes and maintains a wireless bearer service. An access manager can be complex unit and comprise a plurality of various L2 protocols and resource handlers, but it can also be a simple unit, for example a medium access (MAC) layer.

The processes 41 and 42 describe protocol states defined as follows:

RH: Resource handling. A common resource management process that can request and or release resources from different access systems via respective access selection adapters.

L2-LS: L2-Link Status. A process that requests and/or receives L2 trigger information from the access selection adapter. Examples of L2 triggers are signal strength and quality.

NSIS: Next Step In Signaling. NSIS is responsible for the delivery of QoS information locally or end-to-end. The actual protocol implementing NSIS procedures may be RSVP or an enhanced version of it.

CARD: Candidate Access Router Discovery is used for the request of access router capabilities from the network.

FHO: Fast Handover handles all interactions belonging to the IETF's FHO specification.

Table 1 below lists all messages with which the access selector 26 processes interact with the access selector adapters 22.

TABLE 1

Access Selector messages

| | Input messages | Output messages |
| --- | --- | --- |
| L2-LS | Access Status | |
| CARD | CARD reply | CARD request |
| RH | Access (UMTS) ready | Attach |
| | Release (WLAN) ready | Release (WLAN) |
| FHO | Proxy Router Advertisement | Router Sol. For Proxy Fast Binding Update |
| | Fast Binding Ack | Fast Neighbour Advertisement |
| NSIS | Resv | Path++ |
| | Path | Resv++ |
| | Resvconf | |

The access independent RH process is important in order to reserve and or release access system resources independently of access technologies. Like other processes, the RH process is needed both in the access selector 26 and in the access adapter 22. The RH process in the access selector 26 requests for the attachment/resource release to/from the access system and returns an acknowledgment that this has occurred.

The double headed arrow between the L2-LS processes means that is also possible for the access selector 26 to request the status of a link access.

Figure 7:
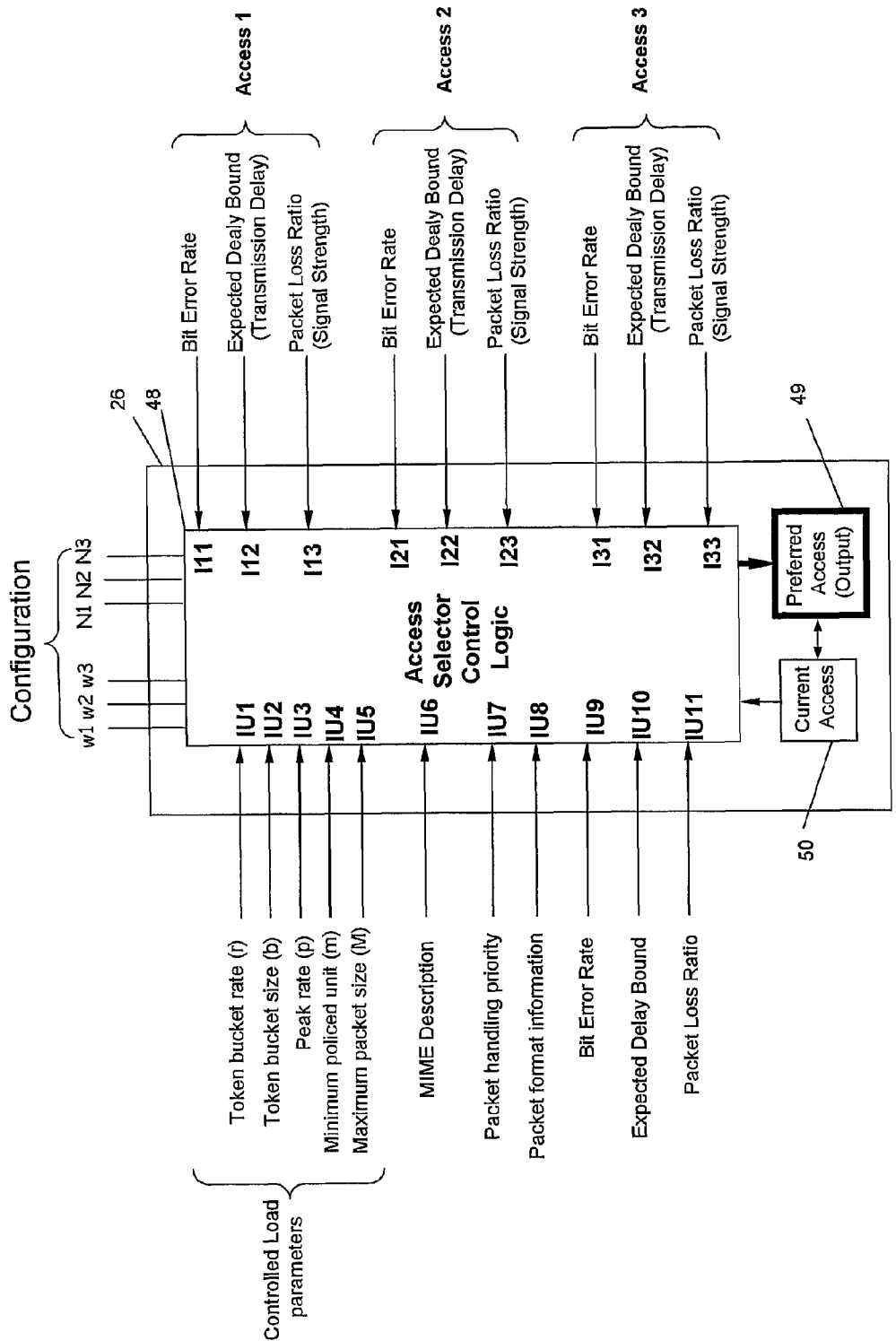

FIG. 7 discloses an embodiment of the access selector 26 which comprises access selector control logic 48, a preferred access selection result 49 and information 50 on the current access. There are three set of inputs to the control logic 48, two set of run time inputs and one set of configuration inputs. One set of run time inputs comprise the QoS profile from the user terminal and these are shown to the left at IU1-IU11. The QoS profile refers to desired characteristics of the access. The other set of run time inputs are the access status information provided from the access adaptors 22 and are shown to the right at I11-I13, I21-I32 and I31-I33. The status information refers to characteristics offered by the respective access networks. At the top of the rectangle of the access selector control logic 48 configuration inputs w1-w3 and N1-N3 from the databases 28 and 37 are shown. The access selector logic 48 comprises the access selector algorithm 33.

When resources are allocated in a network two kinds of inputs are of interest: Which are the characteristics of the traffic to be pumped into the network and which quality shall the traffic have. Parameters IU1-IU8 give a description of the traffic to be injected into the access network, while parameters IU9-IU11 refer to the QoS of the traffic.

In the example described below a simple access selection algorithm is described which uses parameters IU9-IU11 as desired QoS parameters for bit error rate, expected delay bound and packet loss ratio. These are matched against corresponding status information, bit error rate, expected delay bound (=transmission delay) and packet loss ratio, reported from the respective available networks. The status information IU1-IU8 is indirectly included in the status information because the status information relate to traffic already existing in the respective access network. Therefore the example of the algorithm given below will only take notice of the QoS related parameters IU9-IU11 and its corresponding status information reported from the networks.

By matching the information given by access profile against the status information the control logic 48 returns information on the access network that has the best matching or returns an indication that none of the available access networks matches the desired QoS profile. This result is given as the preferred access selection. The preferred access selection is compared against the current access and if the two agree the access in is not changed. If the two disagree the access is changed to the preferred access or, in case no access is matching the QoS profile, the current access is maintained.

FIG. 8 illustrates an example of a technology independent access selection algorithm that comprises three matching equations AC1, AC2 and AC3, one for each access network, and an access selection function fa(MAX(AC1, AC2, AC3)), where i=1, 2, 3 . . . , i being the number of available access networks. There is one matching function for each available access network. Output from the access logic is the result of the access selection function fa(MAX(AC1, AC2, AC3). In the access selection function fa(ACi) gives the index of the access system to be accessed; for example fa(AC3)=3 which is the access network 3. Thus access network 3 is selected.

The matching functions are similar and therefore only the calculation of AC1 is described. Available I11 (bit error rate) is subtracted from desired IU9 (bit error rate). The difference is normalized and weighted. The logarithm of the result is taken. Further available I12 (expected delay bound) is subtracted from desired IU10 (expected delay bound). The difference is normalized and weighted. The logarithm of the result is taken. Further available I13 (packet loss ratio) is subtracted from desired IU11 (packet loss). The difference is normalized and weighted. The logarithm of the result is taken. The three logarithms are added and AC1 results. The same procedures are repeated for matching functions AC2 and AC3 and the maximum of the three values AC1, AC2 and AC3 is selected as access network.

If there is no output, then there is no match between requested service and available QoS parameter information. No access is made but is deferred to a later time when there is a match. To achieve this, the QoS profile is stored in the user terminal. The access selector 26 continues to receive status information from available networks or requests status information from these. At regular intervals, or from time to time, the access selector 26 retrieves the stored QoS profile and compares it with current status information from the available access networks. When there is a match an access network is returned from the algorithm and the terminal 18 is instructed to access it. The terminal will thus behave like it had a scheduling mechanism that schedules an access when the circumstances allow. For example if the user is onboard a vehicle that moves over areas where available access networks only allow a low bit rate, for example 64 kbit/s, and the user sends a request for download of streaming video, which according to its application's QoS profile requires a bandwidth of at least 500 kbit/s, then the access control logic 48 will store the QoS profile and continue to monitor available access networks. When the vehicle approaches a large city, a suitable access network with the required characteristics is detected and the access selector 26 will then automatically access this network and initiate a video streaming session.

Figure 9:
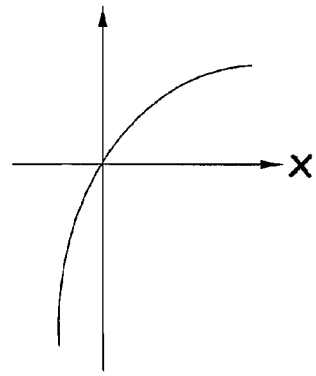

The AC1 to AC3 functions are log functions for the reason that is illustrated in FIG. 9. If the difference between available and requested parameter information is positive a positive log difference value is achieved. If the positive difference increases the positive log difference will increase only slightly and will have a minor influence on the positive part of the matching function. As an example, if the available bit rate greatly surpasses the requested bit rate this will only to a small degree affect the resulting ACi matching function as compared to the case when the available bit rate only slightly surpasses the requested bit rate.

On the other hand, and in opposition to this, if the difference between available and requested parameter information is negative, a negative log difference value results. If the negative difference increases the log difference value will increase heavily and will thus have a great influence on the negative part of the matching function.

Figure 10:
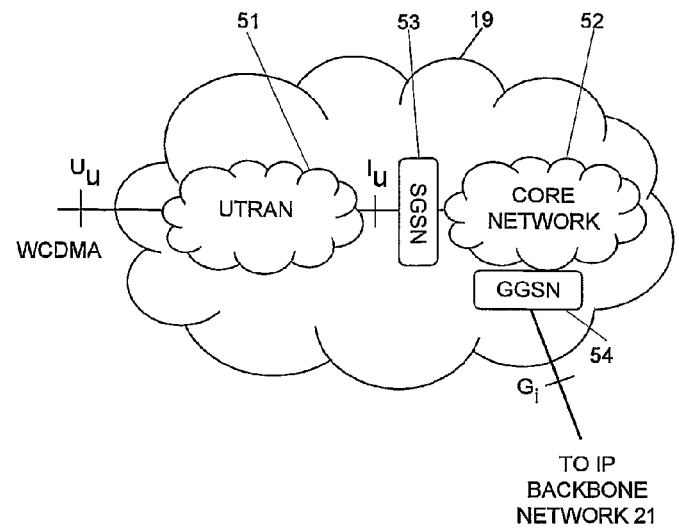

FIG. 10 illustrates an implementation of the access technology 1 used in radio access network 19. UMTS (Universal Mobile Telecommunications System) is used as radio access network. The access technology used in this example is WCDMA (Code Division Multiple Access). UMTS supports high bit rate bearer services with managed QoS characteristics. Logically UMTS is divided into a radio access network UTRAN (UMTS Terrestrial Radio Access Network) 51 and a core network 52 connected with an open interface $I_u$. A packet domain Core Network functionality is logically implemented on two network nodes, the Serving GPRS Support Node SGSN 53 and the Gateway GPRS Support Node GGSN 54. GPRS is an acronym for General Packet Radio System. The UMTS network has an interface $U_u$ towards the user terminal 18 and a standard interface $G_i$ towards the IP based backbone network 21.

Figure 11:
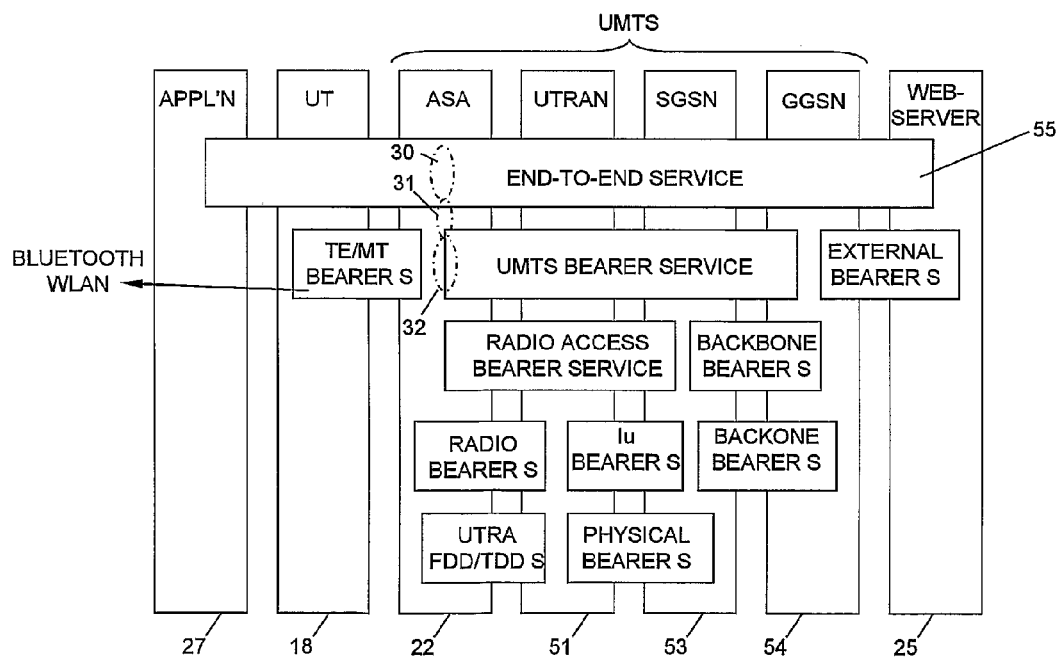

FIG. 11 illustrates a layered QoS bearer service structure in the UMTS network shown in FIG. 10. A bearer service describes how a network provides QoS. It is defined by a signaling protocol, transport in the user plane, and QoS management functions. An application 27 in the user terminal 18 signals end-to-end to a web server 25 connected to the backbone network 21. The situation is illustrated in FIG. 3 and is specialized to an UMTS network. The access adapter or wireless gateway 22 is in this case a PCMCIA card (Personal Computer Modular Card International Association) which the user has inserted into his lap top (user terminal). In an end-to-end bearer service 55 the IP protocol suite is used at layer 3. Preferably IPv4 or IPv6 is used. Accordingly IP is used as a spanning layer i.e. a layer spanning all the entities 27, 18, 22, 51, 53, 54 and 25. It is thus possible for the application 27 to communicate with the access selector 26, the web server 25 or even an application resident in the web server. As indicated in the Figure Bluetooth or WLAN can be used as bearer service between the user terminal 18 and the access selection adapter 22. The QoS controller 30, translator 31 and access manager 32 in the access selection adapter 22 are shown as dashed ellipses. The layered structure makes it clear that the translator 31 translates messages and information from layer 2 to layer 3.

Although IP is described as spanning layer other technologies may in the future be used as spanning layer.

[1] Gábor Fodor, Anders Eriksson, Aimo Tuoriniemi, "Providing Quality of Service in Always Best Connected Networks", *IEEE Communications Magazine*, pp. 154-193, July 2003.
[2] P. M. L. Chan, R. E. Sheriff, Y. F. Hu, P. Conforto and C. Tocci, "Mobility Management Incorporating Fuzzy Logic for a Heterogeneous IP Environment", *IEEE Communications Magazine*, Vol 39, No. 12, pp. 42-51, December 2001.
[3] http://www.ietf.org/internet-drafts/draft-ietf-nsis-reg-09.txt

The invention claimed is:

1. An access selection system for a user terminal, said system providing simultaneous access to a plurality of radio based access networks of diverse access technologies, said radio access networks being adapted for connection to a common backbone network, the system comprising:
a plurality of access selection adapters, each one being a network entity provided separate from the user terminal, and each one associated with a respective radio access network, and each access selection adapter structured for receiving radio access dependent information from its associated access network and for mapping said radio access dependent information to access technology independent status information; and
an access selector being a network entity provided separate from the user terminal, and structured to interact with applications resident in the user terminal and to interact with each access selection adapter for selection of a radio access network based on an individual QoS profile representing an access technology independent information associated with each application and on said access technology independent status information,
wherein each access selection adapter is structured to translate messages and parameters received from the associated access network into QoS parameters, and obtain access technology independent status information from the QoS parameters, and
wherein the access technology independent status information is a set of QoS related parameters relating to a traffic already existing in the respective access network, and the access technology independent information is a set of QoS related parameters defined as requirements associated with the application in the QoS profile.

2. The system in accordance with claim 1, wherein the access selection adapter is structured to implement a protocol spanning the access networks, the backbone network and the access selector to enable interoperation between an application and an end terminal connected to the backbone network and to make the access selection adapter transparent to the application.

3. The system in accordance with claim 2, wherein the protocol spanning the backbone network, the access networks, the access selection adaptors, the access selector, and the applications is one or both of IPv4 and IPv6 protocol suites.

4. The system in accordance with claim 1, wherein the access selection adapter comprises:
an access manager for handling the access to its associated radio access network, and for initiating and setting up a radio bearer; and
a translator for receiving as inputs said radio access dependent information and translating the radio access dependent information into QoS parameters.

5. The system in accordance with claim 4, wherein the radio access dependent information comprises any one or more of the following attributes: signal strength, signal quality, delay, service precedence, reliability, mean throughput and peak throughput, bit error ratio, control load parameters, media description parameters, packet format information, expected delay bound, packet loss ratio, bit error rate (BER), packet handling priority, packet loss ratio (PLR), and combinations thereof.

6. The system in accordance with claim 5, wherein the radio access dependent information further comprises one or both of cost and available bandwidth.

7. The system in accordance with claim 5, wherein the access selection adapter further comprises:
   a QoS controller for receiving the QoS parameters from the translator and mapping the QoS parameters to the access technology independent status information.

8. The system in accordance with claim 1, wherein the user terminal comprises a database containing configuration data for the applications.

9. The system in accordance with claim 1, wherein the access selector comprises means to execute link independent QoS related software processes for access procedures.

10. The system in accordance with claim 9, wherein said QoS related software processes comprise any one or more of an NSIS (Next Step In IP Signaling) process for radio access independent QoS signaling, a layer 2-link (L2-LS) status process for radio access independent link status information and acquisition, and an resource handling (RH) process for radio access independent resource handling.

11. The system in accordance with claim 10, wherein said QoS related software processes further comprise one or both of a radio access independent FHO (Fast Handover) process for handling of mobility, and a CARD (Candidate Access Router) process for acquisition of candidate access routers.

12. The system in accordance with claim 1, wherein the access selector is connected to the backbone network, and is connected to the access networks.

13. A method of providing simultaneous access to a plurality of radio based access networks from a moving system that comprises a user terminal with a plurality of diverse applications, the method comprising:
   the user terminal signaling a QoS profile representing an access technology independent information which an application requires to an access selector at a start of said application, wherein the access selector is an entity separate from the user terminal;
   signaling from each available radio access network via a corresponding individual access selection adapter, which is a network entity provided separate from the user terminal and which is associated with said available access network, to an access selector an access technology independent status information about that access network's resources;
   the access selector identifying a radio access network to be used for the application by executing an access selection algorithm which identifies the radio access network selection based on the QoS parameters signaled in the QoS profile and the access technology independent status information of the available radio access networks received from the corresponding access selection adapters;
   the access selector communicating the radio access network selection to the user terminal; and
   the user terminal instructing the access selection adapter of the selected radio access network to set up a radio bearer in its associated radio access network,
   wherein the step of signaling from each available radio access network the access technology independent status information comprises:
      the access selection adapter receiving radio access dependent information from its corresponding radio access network; and
      mapping the radio access dependent information to the access technology independent status information,
   wherein the mapping step comprises:
      the access selector adapter translating access technology dependent information into QoS parameters; and
      obtaining access technology independent status information from the QoS parameters, and
   wherein the access technology independent status information is a set of QoS related parameters relating to a traffic already existing in the corresponding radio access network, and the access technology independent information is a set of QoS related parameters defined as requirements associated with the application in the QoS profile.

14. The method in accordance with claim 13, wherein the radio access dependent information and the status information are signaled from the access selection adapter to the access selector at time intervals and when there is a change in any QoS parameters associated with the radio access network.

15. The method in accordance with claim 14, wherein a change in the QoS parameter is signaled by a layer 2 trigger or an access technology trigger.

16. A method for scheduling access to an access network from a mobile user terminal, the method comprising:
   an access selector receiving a QoS profile representing an access technology independent information associated therewith from an application resident on the user terminal, the QoS profile specifying requirements of the application and the access selector being a network entity and provided separate from the user terminal;
   the access selector comparing the access technology independent information in the QoS profile with access technology independent status information received from access networks that are available to the user terminal;
   the access selector storing the QoS profile in case said comparison reveals there is no access network available that fulfils the QoS profile;
   the access selector monitoring the status information received from available radio access networks; and
   the access selector repeating the comparison step and instructing the application to execute when the comparison indicates an access network is available that fulfils the QoS profile,
   wherein the access technology independent status information of a radio access network is a set of QoS related parameters relating to a traffic already existing in the radio access network, and the access technology independent information is a set of QoS related parameters defined as requirements associated with the resident application in the QoS profile.

* * * * *